Patented June 18, 1940

2,204,976

UNITED STATES PATENT OFFICE 2,204,976

PROCESS AND PRODUCTS RELATING TO CAPILLARY-ACTIVE SULPHONIUM SULPHATES

Adrianus Johannes Van Peski and Johan Marius Hoeffelman, Amsterdam, Netherlands, assignors to Shell Development Company, San Francisco, Calif., a corporation of Delaware No Drawing. Application July 19, 1938, Serial No. 220,130. In the Netherlands August 27, 1937

20 Claims. (Cl. 260—457)

The present invention relates to a process for the production of a class of capillary-active agents possessing valuable bactericidal, fungicidal, emulsifying, foaming, and wetting properties. More particularly, the invention relates to a process for the production of certain capillary-active sulphonium sulphates. The invention, moreover, relates to a new class of capillary-active sulphonium sulphates.

Sulphonium sulphates as a class are compounds having the general formula

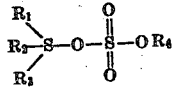

wherein the R's represent organic radicals. The properties of these compounds vary over a wide range and are dependent upon the characters of the various substituted R groups. The basic residue of the sulphonium sulphonates, i. e., the grouping

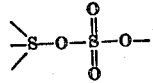

is strongly hydrophilic and these compounds are consequently, in general, soluble in water to give clear solution. It has been found that when the very hydrophilic sulphonium sulphate residue is neutralized, so to say, with appropriate lipophile groups, the resulting sulphonium sulphates are endowed with capillary activity and toxic properties. In general, the water solubility decreases and the oil solubility and capillary activity increase as the total number of carbon atoms in the various R groups increases. The properties of the sulphonium sulphates are, moreover, affected by the nature, relative size, degree of branching and substitution of the R groups. One important factor affecting the characters of the sulphonium sulphates is the disposition or balance of the lipophile groups with respect to the hydrophilic sulphonium sulphate residue. In general, those compounds in which the lipophilic character of the molecule is localized in one or two lipophile groups, are superior. Thus, for example, sulphonium sulphates containing lipophile groups of 1,1,1 and 16 or 1,1,16 and 16 carbon atoms are, in general, superior to one containing lipophile groups of, for instance, 6,6,6 and 1 carbon atoms. The capillary activity and toxic properties of the sulphonium sulphates also depend upon the position of the predominating lipophile group, i. e., whether it is attached to the sulphonium radical (as $R_1$) or to the sulphate radical (as $R_4$). Capillary-active sulphonium sulphates in which the predominating lipophile radical (or one of the two predominating lipophile radicals) is attached to the sulphate radical may be more desirable for certain purposes (especially where the toxic properties of the compound are concerned) than the sulphonium sulphates prepared by the prior art methods in which the lipophilic character of the molecule is centered around the sulphonium group. The properties of the capillary-active sulphonium sulphates are also considerably affected by the nature of the lipophile groups. Lipophile groups of aliphatic character are preferred.

An object of the present invention is to provide a method whereby the preferred capillary-active sulphonium sulphates may be prepared in a more efficient and economical manner. Another object of the invention is to provide a method for the production of certain new and useful capillary-active sulphonium sulphates.

We have found that capillary-active sulphonium sulphates having the preferred lipophile groups may be more easily and economically produced by causing sulphuric acid of suitable concentration to react with a thioether and an alcohol according to the general equation:

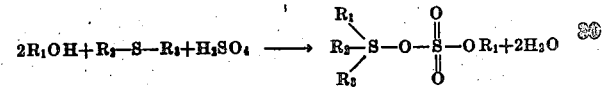

This method of preparation has several advantages. According to the present method the step of preparing the dialkyl sulphate is eliminated. The older methods were practically limited to the use of dialkyl sulphates of the lower alcohols such as methyl and ethyl alcohol. The present method, on the other hand, affords a convenient method for the production of sulphonium sulphates using the higher as well as the lower alcohols. By using higher alcohols according to the present invention sulphonium sulphates containing excellent lipophilic groups attached to the sulphate radical as well as to the sulphonium radical may be produced.

The present process is, in general, applicable to the production of sulphonium sulphates of the general formula

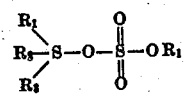

wherein $R_1$ is a substituted or unsubstituted saturated primary aliphatic radical and $R_2$ and $R_3$ may be the same or different radicals of the group consisting of substituted and unsubstituted aliphatic, aryl or aralkyl radicals, and wherein R in at least one case is a short-chain radical containing less than five carbon atoms.

The reaction according to the present invention is executed at an elevated temperature. In general, temperatures ranging from about 80° C. to about 150° C. are preferred, although somewhat higher or lower temperatures may be equally suitable in some cases. The reaction may be executed in an open vessel, if desired, but in such cases where losses due to volatilization would occur we preferably execute the reaction in a closed vessel. Under these conditions, a moderate pressure (the autogenic pressure) may automatically be produced by the vapor pressure of the reaction mixture. The present process may, moreover, be executed batchwise, intermittently, or continuously.

The reaction is preferably executed with concentrated sulphuric acid, the minimum strength of the acid being somewhat dependent upon the alcohol used. In general, sulphuric acid of 96–100% concentration is applicable. Since, however, water is liberated by the reaction, somewhat better results may be obtained if the acid is maintained at the desired strength by the addition of $SO_3$ or oleum during the course of the reaction.

It is sometimes advantageous to carry out the reaction in the presence of an inert solvent or diluent such as a light petroleum fraction, an aromatic hydrocarbon, carbon tetrachloride, or the like. The presence of a solvent or diluent, although not essential, tends to make the reaction proceed smoother and also, upon being removed by distillation after the reaction has been effected, serves as a convenient means of removing the water liberated by the reaction.

The sulphuric acid and a thioether may be reacted, according to the present invention, with any saturated primary aliphatic alcohol to produce sulphonium sulfates. As examples of suitable alcohols may be mentioned methanol, ethanol, propanol, isobutanol, pentanol, dodecyl alcohol, lauryl alcohol, cetyl alcohol, the mixture of alcohols derived from coconut oil, and the like. Such alcohols as the foregoing which contain substituted groups such as halogen atoms, ether groups, etc., may also be used. Examples of such alcohols are β chlorethanol, trimethylene glycol mono ethyl ether, and the like.

We have found that, according to the present process, one may employ thioethers of the general formula $R_2$—S—$R_3$ wherein $R_2$ and $R_3$ are the same or different aliphatic, aryl, or aralkyl radicals. These radicals may, moreover, contain substituted groups such as halogen atoms, nitrate groups, carbonyl groups, alkoxy groups, etc. While thioethers of the above class are generally applicable, the primary thioethers are, in general, more readily reacted than those of secondary character and are, therefore, preferred. For instance, while methyl secondary hexadecyl sulphide will react with methanol and sulphuric acid, the reaction with the higher alcohols is more difficult and, therefore, less desirable. Suitable thioethers are, for example, dimethyl sulphide, diethyl sulphide, dipropyl sulphide, dibutyl sulphide, diamyl sulphide, dihexyl sulphide, methyl dodecyl sulphide, methyl secondary hexadecyl sulphide, methyl cetyl sulphide, ethyl cetyl sulphide, β chlorethyl dodecyl sulphide, ethyl p-tertiary butyl phenoxy isopropyloxy isopropyl sulphide, amyl p-tertiary butyl phenyl sulphide, ethyl cyclohexyl sulphide, di-beta naphthoxy ethoxyethyl sulphide, di-phenoxy ethoxyethyl sulphide, di-cyclohexylphenoxy ethoxyethyl sulphide, di-tetrahydrofurfuryl ethoxyethyl sulphide, etc.

All combinations of the class of alcohols with the thioethers mentioned above are not, however, equally desirable. We have found that in order for the reaction to proceed at a practical rate it is desirable that at least one of the lipophile groups introduced into the sulphonium sulphate residue be a relatively short-chain group containing preferably not more than five carbon atoms. Therefore, we preferably react either a lower molecular weight thioether, i. e., having up to about ten carbon atoms, with a lower or higher molecular weight alcohol and sulphuric acid, or a higher or lower molecular weight thioether with a lower molecular weight alcohol, i. e., one having up to about five carbon atoms, and sulphuric acid. If it is attempted to react sulphuric acid with a high molecular weight thioether and a high molecular weight alcohol it is found that the reaction is very slow. This, it should be noted, is not a disadvantage, however, since, as previously pointed out, the preferred products are those in which the lipophilic character of the sulphonium sulphate is predominately centered in one or two lipophile groups.

In general, the sulphuric acid, thioether and alcohol are charged in about their stoichiometric proportions (1,1 and 2 mols, respectively) or an excess of the lower-boiling reactant is used. After completion of the reaction any excess of the lower-boiling reactant may be recovered.

The following examples, which are not to be construed as limitative, illustrate the process of the present invention as applied to the preparation of a few capillary-active sulphonium sulphates.

*Example I*

Dimethyl cetyl sulphonium methyl sulphate

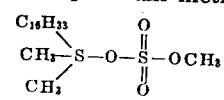

is prepared by heating a mixture consisting of 3 mols methanol, 1 mol 100% $H_2SO_4$, and 1 mol methyl cetyl sulphide at about 120° C. under reflux for about two hours while stirring. The sulphonium sulphate which is obtained in a yield of about 55% may be recovered by diluting the reaction product with an excess of ether and filtering off the precipitated sulphonium compound. The product is a white capillary-active crystalline compound soluble in water to give clear solutions.

*Example II*

In order to demonstrate that the preparation according to Example I is not equivalent to reacting methyl cetyl sulphide with dimethyl sulphate an experiment comparable to Example I was made in which the methyl cetyl sulphide was omitted. A mixture consisting of 3 mols methanol and 1 mol 100% $H_2SO_4$ was heated at about 120° C. under reflux for about two hours while stirring. The reaction product contained large quantities of dimethyl ether and only about 2.9% dimethyl sulphate.

Example III

Di-ethyl n-dodecyl sulphonium n-dodecyl sulphate

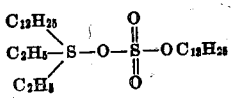

is prepared by heating a mixture consisting of 2 mols n-dodecanol, 1 mol 100% $H_2SO_4$, and 1 mol di-ethyl sulphide at about 120° C. for about one hour. The sulphonium sulphate which may be recovered from the reaction mixture by conventional methods contains a dodecyl radical attached to the sulphate radical. This product, although the lipophile groups are only 12 carbon atoms long, has good emulsifying properties and is capable of producing large quantities of very stable foam.

Example IV

β-chlorethyl methyl n-dodecyl sulphonium β-chlorethyl sulphate

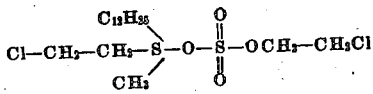

is prepared by heating a mixture of 2 mols β-chlorethanol, 1 mol 100% $H_2SO_4$ and 1 mol methyl n-dodecyl sulphide at about 130° C. for about 2½ hours while stirring.

Example V

Dimethyl secondary hexadecyl sulphonium methyl sulphate

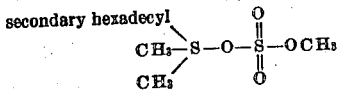

is prepared by heating a mixture consisting of 4 mols methanol, 1 mol 100% $H_2SO_4$ and 1 mol methyl secondary hexadecyl sulphide at about 110° C. under reflux for a few hours while stirring. An optional method of recovering the sulphonium sulphate is as follows: the reaction product is taken up with water and then neutralized with alkali. The aqueous solution is then extracted with ether to remove the non-converted thioether and then evaporated in vacuo. The residue is then extracted with acetone, in which the sulphonium compound is soluble. Upon evaporation of the acetone the sulphonium sulphate is recovered in a yield of about 50% by weight, calculated on the thioether used. The product is a capillary-active yellow viscous liquid giving clear solutions when dissolved in water and possessing fair foaming properties.

Example VI

Diethyl cetyl sulphonium cetyl sulphate

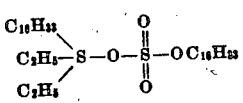

is prepared by heating a mixture consisting of 2 mols cetyl alcohol, 1 mol 100% $H_2SO_4$, and 1 mol diethyl sulphide at about 135° C. for 1½ hours. An optional method of recovering the sulphonium sulphate is as follows: The reaction product is taken up with ether and shaken out with water to which a little ethyl alcohol has been added. The ether layer is dried over anhydrous $Na_2SO_4$ and then cooled, whereupon the sulphonium sulphate crystallizes out. This product which contains a 16-carbon atom lipophile group attached to the sulphate radical is soluble in warm gasoline as well as in water and possesses good foaming properties. The product melts at about 93–94° C.

The above examples illustrate the preparation of only a few of the many products which may be prepared according to the present invention. By the proper choice of thioether, of which there are many available, and alcohol as starting materials, lipophile groups of almost any molecular weight, chain length, and if desired, containing desirable substituted groups, may be attached to the sulphonium sulphate residue to produce capillary-active compounds having the maximum efficiency for the particular purpose at hand. By employing high molecular weight alcohols, new sulphonium sulphates containing desirable lipophile groups attached to the sulphate radical may be produced. As desirable lipophile groups to be attached to the sulphate group, come mainly into consideration saturated primary aliphatic radicals containing from about 10 to about 25 carbon atoms. In order to produce capillary activity the lipophile group should contain more than about six carbon atoms.

The capillary-active sulphonium sulphates prepared according to the present process are very useful products. They possess varying degrees of wetting, emulsifying, and foaming properties and may be used by themselves or with other capillary-active agents in any relation to which capillary-active agents have hitherto been used. For example, they may find application in the manufacture of pharmaceutical products, cosmetics, paints, lubricating oils and greases, leather, asphalt and other emulsions, metal cleaners, polishes, absorbent cotton, etc.

One of the outstanding properties of the present sulphonium sulphates is their germicidal and fungicidal property which, since it is combined with varying degrees of capillary activity and desirable solubility characteristics, makes these products exceptionally well suited for numerous purposes where a combination of these properties is desired. For example, the present products may find application in disinfectants, antiseptics, insecticidal and fungicidal sprays, medicated soaps, dairy detergents, moth-proofing preparations, seed dopes, sizing preparations, adhesives, preservatives, wood-treating and preservation, water paints, etc.

We claim as our invention:

1. A process for the production of capillary-active sulphonium sulphates which comprises the steps of causing sulphuric acid of from about 96 to 100% concentration to react with a primary aliphatic thioether containing less than ten carbon atoms and a saturated primary aliphatic alcohol containing more than five carbon atoms, and recovering the capillary-active sulphonium sulphate from the reaction mixture.

2. A process for the production of capillary-active sulphonium sulphates which comprises the steps of causing sulphuric acid of from about 96 to 100% concentration to react with a primary thioether containing less than ten carbon atoms and a saturated primary aliphatic alcohol containing more than five carbon atoms, and recovering the capillary-active sulphonium sulphate from the reaction mixture.

3. A process for the production of capillary-active sulphonium sulphates which comprises the steps of causing sulphuric acid of from about 96 to 100% concentration to react with a thioether containing less than ten carbon atoms and a saturated primary aliphatic alcohol containing more than five carbon atoms, and recovering the capillary-active sulphonium sulphate from the reaction mixture.

4. A process for the production of capillary-active sulphonium sulphates which comprises the steps of causing sulphuric acid to react with a thioether containing less than ten carbon atoms and a saturated primary aliphatic alcohol containing more than five carbon atoms, and recovering the capillary-active sulphonium sulphate from the reaction mixture.

5. A process for the production of capillary-active sulphonium sulphates which comprises causing sulphuric acid to react with a thioether containing less than ten carbon atoms and a saturated primary aliphatic alcohol containing more than five carbon atoms.

6. A process for the production of capillary-active sulphonium sulphates which comprises the steps of reacting sulphuric acid of from about 96 to 100% concentration with a thioether and a saturated primary aliphatic alcohol at a temperature of from about 80° C. to about 150° C. and maintaining the concentration of the sulphuric acid between about 96 and 100% by the addition of $SO_3$ or oleum during the course of the reaction.

7. A process for the production of capillary-active sulphonium sulphates which comprises the step of reacting sulphuric acid of from about 96 to 100% concentration with a thioether and a saturated primary aliphatic alcohol at a temperature of from about 80° C. to about 150° C.

8. A process for the production of capillary-active sulphonium sulphates which comprises the step of reacting sulphuric acid with a thioether and a saturated primary aliphatic alcohol at a temperature of from about 80° C. to about 150° C.

9. A process for the production of capillary-active sulphonium sulphates which comprises the step of reacting sulphuric acid with a thioether and a saturated primary aliphatic alcohol at an elevated temperature.

10. A process for the production of capillary-active sulphonium sulphates which comprises the steps of reacting sulphuric acid with a primary thioether and a saturated primary aliphatic alcohol at a temperature of from about 80° C. to about 150° C. in a closed vessel under the autogenic pressure and recovering the capillary-active sulphonium sulphate from the reaction mixture.

11. A process for the production of capillary-active sulphonium sulphates which comprises the steps of reacting sulphuric acid with a primary aliphatic thioether and a saturated primary aliphatic alcohol and recovering the capillary-active sulphonium sulphate from the reaction mixture.

12. A process for the production of capillary-active sulphonium sulphates which comprises the steps of reacting sulphuric acid with a primary thioether and a saturated primary aliphatic alcohol and recovering the capillary-active sulphonium sulphate from the reaction mixture.

13. A process for the production of capillary-active sulphonium sulphates which comprises the step of causing sulphuric acid to react with a thioether and a saturated primary aliphatic alcohol.

14. As a compound a tri-aliphatic sulphonium cetyl sulphate.

15. As a compound a tri-aliphatic sulphonium n-dodecyl sulphate.

16. A capillary-active sulphonium sulphate of the general formula

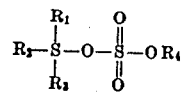

wherein $R_1$, $R_2$ and $R_3$ are radicals selected from the group consisting of the hydrocarbon and substituted hydrocarbon radicals, and $R_4$ is a radical selected from the group consisting of the hydrocarbon and substituted hydrocarbon radicals which contain more than six carbon atoms.

17. A capillary-active sulphonium sulphate of the general formula

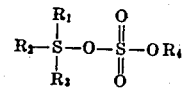

wherein $R_1$, $R_2$ and $R_3$ are hydrocarbon radicals, and $R_4$ is a hydrocarbon radical which contains more than six carbon atoms.

18. A capillary-active sulphonium sulphate of the general formula

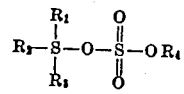

wherein $R_1$, $R_2$ and $R_3$ are hydrocarbon radicals, and $R_4$ is an aliphatic primary hydrocarbon radical which contains more than six carbon atoms.

19. A capillary-active sulphonium sulphate of the general formula

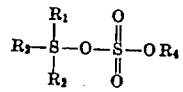

wherein $R_1$, $R_2$ and $R_3$ are aliphatic hydrocarbon radicals, and $R_4$ is an aliphatic primary hydrocarbon radical which contains more than six carbon atoms.

20. A capillary-active sulphonium sulphate of the general formula

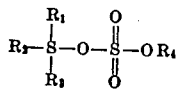

wherein $R_1$, $R_2$ and $R_3$ are radicals selected from the group consisting of the hydrocarbon and substituted hydrocarbon radicals at least one of said radicals containing more than six carbon atoms, and wherein $R_4$ is a radical selected from the group consisting of the hydrocarbon and substituted hydrocarbon radicals which contain more than six carbon atoms.

ADRIANUS JOHANNES VAN PESKI.
JOHAN MARIUS HOEFFELMAN.